United States Patent Office 3,115,398
Patented Dec. 24, 1963

3,115,398
FUEL OIL ADDITIVES AND COMPOSITIONS
Helen I. Thayer, Pittsburgh, Pa., assignor to Gulf Research & Development Company, Pittsburgh, Pa., a corporation of Delaware
No Drawing. Filed June 11, 1959, Ser. No. 819,566
15 Claims. (Cl. 44—66)

This invention relates to addition agents for distillate fuel oils and stabilized distillate fuel oils containing the same.

In the storage of untreated distillate fuel oils at room temperature, problems with regard to sludge deposition are frequently encountered. Sludge deposits in distillate fuel oils are objectionable due to a tendency of such deposits to cause clogging of burner filters, screens, nozzles, etc., which interferes with the normal functioning of the burners in which the fuel oil is consumed.

The nature of the sludge deposits is dependent on the fuel oil source. Thus, in straight run distillate fuel oils, which contain primarily stable paraffinic components, the sludge formation is primarily due to the presence of compounds not normally present in the oil which cause instability in the oil. These impurities are probably added to the oil or incompletely removed during the refining operation. The problem of sludge formation in such oils is one involving oxidation and the formation of insoluble products of oxidation.

Fuel oil distillates that have been produced in catalytic cracking processes contain a large percentage of olefinic and aromatic compounds as well as mixtures of these compounds. The sludging encountered in these oils is primarily due to condensation or polymerization reactions in which high molecular weight products are formed that exhibit limited solubility in the oil.

When fuel oils are composed of a blend of straight run and catalytically cracked products, still another problem is encountered. The sludge formed in these oils is consistently more voluminous than would be expected from the known sludging tendency of the component oils, although the sludge probably contains some sludge of the type formed in each component oil.

I have found that the sludge formed in mixtures of catalytically cracked and straight run fuel oils can be substantially diminished by incorporation in the oil of small amounts of the addition agents of this invention. The addition agents included in this invention are the oil-soluble reaction products of (a) primary, secondary and tertiary alkyl (cyclic or open-chain), alkenyl or alkylol, mono- or diamines whose alkyl, alkenyl or alkylol substituents contain 2 to 22 carbon atoms each, and (b) complex anhydrides prepared by reacting a partially esterified orthophosphoric acid, including their thio analogues, that contain 1 to 2 organic substituents, at least one of which is a hydrocarbon radical containing 5 to 22 carbon atoms and the other of which, when present is a hydrocarbon radical containing 1 to 22 carbon atoms, and a borylating agent such as boric acid, boric oxide, or an anhydride of boric oxide and an aliphatic monocarboxylic acid, preferably a $C_{1-8}$ unsubstituted acid, such as acetic acid, in the ratio of about 0.5 to about 6 moles of partially esterified orthophosphoric acid per mole of borylating agent, under conditions conducive to anhydride formation. The amines and complex anhydrides are reacted in the proportion of 0.5 to 2 equivalents of anhydride per equivalent of amine.

Examples of reaction products included by this invention are the products of, for example, 0.5, 1 or 2 equivalents of any of the anhydrides formed from, for example, 0.1, 1 or 2 moles of boric acid and one mole of any of the following compounds: ethyl lauryl monoacid orthophosphate, di(2-ethylhexyl) monoacid orthophosphate, mono(2-ethylhexyl) diacid orthophosphate, dioctyl monoacid orthophosphate, di(isooctylphenyl) dithiaphosphate, diamyl monoacid orthophosphate, monooctyl diacid orthophosphate, and an equivalent of an amine whose alkyl, alkenyl or alkylol substituents contain 2 to 22 carbon atoms, for example, n-butylamine, diethylamine, 2-ethylhexylamine, 3-isopropylamine, cyclohexylamine, tertiarybutylamine, octylamine, decylamine, dodecylamine, tetradecylamine, N,N-dibutyl isopropylamine, 3-isopropylaminopropylamine, N-octadecenyl ethylene diamine, 3-dodecylaminopropylamine, and those mono- and diamines where the respective nitrogen substituents are mixed alkyl and alkenyl groups obtained from naturally occurring fats and oils, e.g., tallow, soybean oil, coconut oil and the like. In such instances, aliphatic N-substituents will be monovalent straight-chain hydrocarbon radicals containing an even number of carbon atoms from 8 to 22. Examples of such mixtures are: 3-"tallow"-aminopropylamine, 3-"soya"-aminopropylamine, 3-"coco"-aminopropylamine, cocoamine, etc.

The present invention includes the amine derivatives of compounds of the class disclosed above, the methods of preparing these derivatives and fuel oil compositions containing said derivatives.

The compounds of this invention can be prepared in any suitable manner; for example, they can be prepared by gently heating a complex borylated anhydride of the type described and an amine of the class indicated in a suitable vessel at low heat, for example, 40° to 60° C., for approximately one-half hour, or more. The product formed is a semi-solid melt or viscous oily liquid which is recovered on cooling. Although moderate heating of the reactants may be desirable at first to facilitate admixture of the reactants, the reaction will take place spontaneously with evolution of heat. The reaction temperature can be maintained in the desired range by controlling the rate of addition of the amine to the reaction mixture. The reaction products of the thio analogues of the complex anhydrides are prepared most advantageously in the presence of an inert low boiling solvent for the respective reactants, such as pentane, hexane, heptane, benzene, etc. The technique is essentially the same except for the added step of solvent removal after the reaction is complete. The range of the reactant ratios is 0.5 to 2 equivalent weights of anhydride to one equivalent weight of amine. The preferred ratio is 0.5 equivalent weight of anhydride to one equivalent weight of amine.

It is most convenient to carry out the foregoing reaction at atmospheric pressure and no apparent advantage is derived from increasing or decreasing the pressure.

The reaction involved is essentially a neutralization of the acidic anhydride by the amine and takes place very rapidly. In all cases, reaction is complete in less than one hour.

From the foregoing it will be seen that the amine reaction products included in this invention can be graphically represented by the general formula:

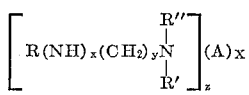

where R is an alkyl, alkenyl or alkylol group containing 2 to 22 carbon atoms, x is 0 or 1, R' and R'' are hydrogen when x is greater than zero, or hydrogen or alkyl, alkenyl or alkylol groups of the same kind as R when x is 0, y is an integer from 0 to 3 but is zero only when x is zero, H is hydrogen, N is nitrogen, A is an acid radical derived from a complex borophosphate anhydride prepared as described, z is 5 to 10 and w is 1 to 4 and z and w are not necessarily whole numbers.

The preparation of the complex anhydrides disclosed herein is disclosed in detail in my copending application Serial No. 819,569, now U.S. Patent 3,047,607, filed concurrently herewith. Briefly, that application discloses that these products are formed by the reaction of at least one member selected from the group consisting of partial esters of orthophosphoric acid and their thio analogues that contain 1 to 2 organic substituents, at least one of which is a hydrocarbon radical containing 5 to 22 carbon atoms and the other of which is hydrogen or a hydrocarbon radical containing 1 to 22 carbon atoms, with a borylating agent such as boric acid, boric oxide, and anhydrides of boric oxide and aliphatic monocarboxylic acids, preferably $C_{1-8}$ unsubstituted acids, in the range of about 0.5 to about 6 moles of the partially esterified orthophosphoric acid per mole of borylating agent, at a temperature of 50° to 145° C., e.g., 80° C. in the presence of benzene for a period of about 0.5 to 24 hours, e.g., 20 hours. Examples of complex anhydrides whose use is included by this invention are anhydrides formed from, for example, 0.1 1 or 2 moles of any borylating agent of the group: boric acid, boric oxide and the anhydride of boric oxide and acetic acid, and one mole of any of the following partially esterified orthophosphoric acids: ethyl lauryl monoacid orthophosphate, di(2-ethylhexyl) monoacid orthophosphate, di(n-octyl) monoacid orthophosphate, mono-di(2-ethylhexyl) orthophosphate, methyl octyl monoacid orthophosphate, lauryl cetyl monoacid orthophosphate, dioctadecyl monoacid orthophosphate, dimethylcyclohexyl monoacid orthophosphate, di(ethylcycloheptyl) monoacid orthophosphte, phenyl tolyl monoacid orthophosphate, dinaphthyl monoacid orthophosphate, and the thio or diacid analogues of the above-listed phosphate esters.

The structure of the amine reaction products of this invention is not fully understood because of the complex nature of the borylated orthophosphoric acid ester anhydride. However, it does appear that the amines disclosed herein react to form addition salts with the available acid groups of the borylated phosphoric acid ester anhydrides including, in the case of primary or secondary amines, the dehydro or amido form of such salts, and/or mixtures of such salts and amides. The preparation and the character of the compounds of this invention can be further illustrated by the following examples:

EXAMPLE 1

A solution of 500 grams (1.8 moles) of mono-di(2-ethylhexyl) orthophosphate, a mixture of 25% mono- and 75% diester, in 1000 milliliters of benzene was added to a 2000 milliliter flask equipped with a Dean-Stark trap and a reflux condenser. A charge of 40 grams (0.58 mole) of boric oxide was added. The slurry was heated to 80° C., the reflux temperature of the benzene, and maintained at that temperature until no more water was being evolved. The slurry was allowed to cool to room temperature and was filtered to remove the unreacted boric oxide. The benzene was removed by distillation at its boiling point leaving the product in the distillation flask. A charge of 359 grams (2.54 equivalents) of this anhydride was placed in a three-neck round bottomed flask equipped with stirrer, condenser and thermometer. Tertiary-butylamine in the amount of 188 grams (2.57 equivalents) was added slowly enough to keep the temperature at about 60° C. during the addition. After the addition was complete, the stirring was continued until the ingredients were homogenized. The preparation was completed in about 40 minutes. The reactants formed an orange-yellow oily liquid which was cooled and recovered. Analysis was as follows:

| | Percent |
|---|---|
| Phosphorus | 8.41 |
| Boron | 1.3 |

EXAMPLE 2

Borylated di(p-isooctylphenyl) dithiophosphoric acid was prepared by heating 126 grams (0.25 mole) of di(p-isooctylphenyl) dithiophosphoric acid with 15 grams (0.22 mole) of boric oxide in the presence of benzene. Heating was continued for 17 hours at temperatures of 80° to 100° C. and the solution filtered to remove the unreacted boric oxide. The amine salt was prepared by adding 88 grams (0.44 equivalent) of the commercial 3-"tallow"-aminopropylamine which is a commercial mixture of alkyl and alkenyl aminopropylamines whose alkyl and alkenyl groups are mixed groups derived from tallow fatty acids, to 150.9 grams (0.22 equivalent) of the borylated phosphate ester in benzene. The solution was heated to 30° to 60° C. for 40 minutes, the benzene was removed by distillation at its boiling point and the product recovered. The analysis was as follows:

| | Percent |
|---|---|
| Boron | 0.53 |
| Phosphorus | 3.53 |
| Sulfur | 3.88 |

EXAMPLE 3

In another preparation the di(p-isoctylphenyl) dithiophosphoric acid compound was synthesized as follows:

A charge of 1 mole (206.3 grams) of p-isooctylphenol was added to a flask equipped with a stirrer and a reflux condenser. The phenol was heated to 115° C. and phosphorus pentasulfide ($P_4S_{10}$) in the amount of 55.5 grams (0.125 mole) was added slowly enough to keep the temperature in the range of 130° to 145° C. The solution was stirred vigorously for 3 hours. The crude product was filtered hot through glass wool. To one-tenth of a mole (61.7 grams) of the dithiophosphoric acid in 125 milliliters of benzene 7 grams (0.1 mole) of boric oxide was added. The temperature was increased to the boiling point of benzene and the slurry was refluxed for 22.5 hours. The solution was then cooled, filtered and the solvent removed by distillation at its boiling point. The product analysis was as follows:

| | | |
|---|---|---|
| Sulfur | Percent | 5.79 |
| Boron | do | 1.22 |
| Neutral equivalent | | 415 |

Neutral equivalent is defined as that amount of material in grams which will furnish one gram ionic weight of hydrogen ion or will react with one equivalent (56.10 grams) of potassium hydroxide.

A charge of 26.6 grams (0.064 equivalent) of this product was dissolved in 50 milliliters of hexane and placed in a flask equipped with a stirrer. The amine, 25.6 grams (0.13 equivalent) of 3-"tallow"-aminopropylamine as defined above, was dissolved in 25 milliliters of hexane and added to the product of the above-described reaction with vigorous stirring. After the reaction was complete, the solution was cooled, filtered and the solvent removed under vacuum. An oil solution of the product gave an alkaline test.

Examples of other amine reaction products included by this invention that are prepared by substantially similar procedures to those described in Examples 1, 2 and 3 are indicated in Table I below:

*Table I*

PRODUCTS DERIVED FROM BOROPHOSPHORIC ANHYDRIDES

| Examples | Reactants | Analyses in Percent | Reactant Ratio Anhydride: Amine (in equivalents) |
|---|---|---|---|
| 4 | a. Reaction products of 3-"tallow"-amino-propylamine and *mono-di(2-ethylhexyl) orthophosphate-boric oxide product (3.0:1 molar ratio). | Ash, 6.78 | 1:2 |
| 5 | ----do---- | | 1:1 |
| 6 | ----do---- | | 2:1 |
| 7 | Ethyl lauryl orthophosphate-boric oxide product (1:1 molar ratio). | | 1:2 |
| 8 | Monooctyl diacid orthophosphate-boric oxide product (2:1 molar ratio). | | 1:2 |
| 9 | Di(p-isooctylphenyl) dithiophosphoric acid-boric oxide product (1:1 molar ratio). | B, 0.62; S, 2.95 | 1:2 |
| 10 | ----do---- | B, 0.26; P, 3.65; S, 4.84. | 1:2 |
| 11 | ----do---- | B, 0.46; P, 3.20; S, 4.01. | 1:2 |
| 12 | ----do---- | B, 0.53; P, 3.53; S, 3.88. | 1:2 |
| 13 | ----do---- | B, 0.48; P, 3.14; S, 5.04. | |
| 14 | b. Reaction products of diethylamine and *mono-di(2-ethylhexyl) orthophosphate - boric oxide product (3.0:1 molar ratio). | P, 7.25; Ash, 1.69 | 1:1 |
| 15 | c. Reaction products of 3-isopropylaminopropylamine and *mono-di(2-ethylhexyl) orthophosphate-boric oxide product (3.0:1 molar ratio). | | 1:2 |
| 16 | d. Reaction products of 2-ethylhexylamine and *mono-di(2-ethylhexyl) orthophosphate - boric oxide product (3.0:1 molar ratio). | | 1:1 |

*A mixture of mono- and diesters.

The foregoing examples indicate the manner of preparing the compounds of this invention, and the compounds prepared therein are representative specific embodiments of the disclosed class. Other specific compounds included in this invention can be prepared by the reaction in the indicated or equivalent proportions of other disclosed amines with other equivalent complex anhydrides disclosed herein.

The amine reaction products of this invention have been found effective in small concentrations to alleviate the problem of storage instability in fuel oil. It is obvious that the various compounds of the herein disclosed class do not possess exactly identical effectiveness, and the most advantageous concentration for each compound will depend to some extent upon the particular compound used. Also, the minimum effective inhibitor concentration may vary somewhat according to the nature of the fuel oil to be treated. In general, however, the herein disclosed compounds are useful in concentrations of as little as 0.005 percent to about 1 percent by weight of the composition. A major improvement in the storage stability characteristics of the distillate fuel oils is obtained by incorporation therein, respectively, from about 0.01 to about 0.1 weight percent of the herein disclosed class of compounds. However, in some fuel oils, it will be advantageous to add as much as about 0.5 percent by weight of the composition, and in unusual instances it may be found desirable to add as much as 1 percent by weight of the composition.

The amine salts of this invention are valuable in inhibiting deposits in mixtures of catalytically cracked and straight run distillate fuel oils of which are the so-called No. 2 fuel oils, i.e., distillates boiling between 350° F. and 750° F. and having a minimum API gravity of about 26. The problem of sludging in fuel oil is serious when the volume ratio of straight run and catalytically cracked oil is between 9:1 and 1:9. The problem is particularly troublesome when the ratio is between 4:1 and 1:4.

The reaction products of the complex anhydrides included by this invention may be incorporated in a fuel oil in any suitable manner. Thus, the compounds may be added per se directly to the fuel or they may be added in the form of concentrates either immediately after distillation and/or blending of the fuel oil, or after the fuel oil has been stored for a substantial period of time. In the case of mixed catalytically cracked and straight run distillate fuel oils, the compounds may be added per se, or in the form of concentrated solutions or dispersions in the catalytically run fuel oil distillate prior to blending of the components to form a mixed fuel oil. It is generally preferred to employ the compounds in the form of concentrates in the blending procedure. Suitable concentrates containing the addition agents of this invention comprise, for example, mineral oil solutions or dispersions containing from about 10 to 75 percent by weight and preferably 25 to 50 weight percent active ingredients. Where the concentrates are in the form of dispersions, it may be desirable to heat the concentrates and/or the fuel oil to about 100° to 140° F. in order to facilitate blending. An alternate blending procedure involves incorporation in the fuel oil at storage temperature of concentrated solutions of the inhibitors in solvents, other than mineral oils, that have a high degree of solubility for the inhibitors and that do not adversely affect the stability or other characteristics of the fuel. Examples of such solvents include benzene, toluene, hexane, methyl isobutyl ketone, and methyl ethyl ketone.

The usefulness of the reaction products of this invention as fuel oil sludge inhibitors has been demonstrated by means of a standard accelerated sludging test which is carried out by heating 600 gram samples of the fuel oil being tested for a period of 16 hours at 210° F. in loosely stoppered, one quart, clear glass bottles. Following each heating period, each test sample is cooled to room temperature and filtered by suction through tared, medium porosity fritted glass Gooch type crucibles. The sludge in each crucible is washed with heptane. Complete removal of the sludge adhering to the inside of the bottles is obtained by means of a rubber policeman and heptane. The respective crucibles are then dried in an oven maintained at 210° F. for one hour, cooled in a desiccator and reweighed. The increase in weight is recorded as milligrams of sludge per 600 grams of oil. The effectiveness of an inhibitor can be judged by comparison of the sludge produced in inhibited and uninhibited samples of fuel oil.

The unusual effectiveness of the reaction products of this invention is demonstrated by data presented in the table below, in which there are presented the results obtained with the fuel oil sample containing respectively: the 3-"tallow"-aminopropylamine derivative of the compounds of Examples 9, 4, 5, 7, and 8. The fuel oil samples designated under run No. 2, No. 3, No. 5, No. 6 and No. 7 constitute specific embodiments of the fuel oil compositions of this invention.

Table II
TEST OF VARIOUS BOROPHOSPHORIC ANHYDRIDES AND DERIVATIVES
[Evaluation of No. 2 fuel oil additives 50/50 blend]

| Run No | 1 | 2 | 3 | 4 | 5 | 6 | 7 | 8 | 9 |
|---|---|---|---|---|---|---|---|---|---|
| Fuel Oil Make-Up, Percent Volume: Eastern Venezuela Straight Run No. 2 Fuel Oil Distillate | 50 | 50 | 50 | 50 | 50 | 50 | 50 | 50 | 50 |
| Fluid Catalytically Cracked Fuel Distillate No. 2 | 50 | 50 | 50 | 50 | 50 | 50 | 50 | 50 | 50 |
| Sample Make-Up: Fuel Oil Blend, Percent | 100 | 100 | 100 | 100 | 100 | 100 | 100 | 100 | 100 |
| Additive, Weight Percent: | | | | | | | | | |
| Addition Agent of Example 9 | | .05 | | | | | | | |
| Addition Agent of Example 4 | | | .02 | | | | | | |
| Addition Agent of Example 5 | | | | | .05 | | | | |
| Addition Agent of Example 7 | | | | | | .05 | | | |
| Addition Agent of Example 8 | | | | | | | .05 | | |
| 3-"tallow"-aminopropylamine: Derivative of Orthoboric Acid (4:3 equivalent ratio) | | | | | | | | .05 | |
| 3-"tallow"-aminopropylamine: Derivative of Boron Phosphate (4:3 equivalent ratio) | | | | | | | | | .02 |
| Stability Test, 16 Hours, at 210° F.: Potential Insoluble Matter, mg./600g | 18.5 | 1.4 | 1.0 | 18.6 | 4.9 | 6.9 | 9.6 | 17.2 | 17.1 |

The results shown in the first and fourth numerical columns indicate the sludging tendencies of two different samples of an uninhibited blended No. 2 fuel oil. The results in the 2nd, 3rd, 5th, 6th and 7th numerical columns of the table show remarkable improvement in the sludge depositing characteristics of the fuel oil samples containing, respectively, the addition salts of Examples 9, 4, 5, 7 and 8.

It is apparent from these data that the reaction products of 3-"tallow"-aminopropylamine and the mono-di(2-ethylhexyl) orthophosphate boric oxide product of Example 4 gave the most favorable results. The addition of only 0.02 weight percent of the additive reduced the potential insoluble matter from 18.5 to 1.0. Comparison of the data in the 3rd column with the data in the 5th column shows such additive is more effective when it is prepared using an anhydride to amine equivalent ratio of 0.5:1 than when the equivalent ratio is 1:1. Thus, a product having the 0.5:1 anhydride to amine ratio was several times as effective as the corresponding additive wherein the equivalent ratio was 1:1. The value of these compounds as fuel oil stabilizers is underlined by comparison of the stability of fuel oil samples containing the amine reaction products of this invention with the stability of fuel oil samples containing the 3-"tallow"-aminopropylamine derivatives of unsubstituted orthophosphoric acid and orthoboric acid set out in run Nos. 8 and 9. Neither of the latter materials had any particular effect on the stability of the oil. In the most favorable case, the potential insoluble matter was reduced from 18.6 to 17.1.

If desired, the stable fuel compositions of this invention may contain in addition to the additives disclosed herein other improvement agents, for example, oxidation inhibitors, flash point control agents, corrosion inhibitors, anti-foam agents, ignition quality improvers, combustion improvers and other additives adapted to improve the oils in one or more respects.

While my invention is described with reference to various specific examples and embodiments, it will be understood that the invention is not limited to such examples and embodiments and may be variously practiced within the scope of the claims hereinafter made.

I claim:

1. The reaction product of (a) an amine selected from the group consisting of primary, secondary, and tertiary alkyl, alkenyl, and alkylol mono- and diamines whose substituents contain 2 to 22 carbon atoms each, and (b) an anhydride prepared by reacting a member selected from the group consisting of partially esterified orthophosphoric acids and their thio analogues, at least one of whose substituents is a hydrocarbon radical containing 5 to 22 carbon atoms and the other substituent of which, when present, is a hydrocarbon radical containing 1 to 22 carbon atoms, with a borylating agent selected from the group consisting of boric acid, boric oxide and an anhydride of boric oxide and an aliphatic monocarboxylic acid, in the ratio of about 0.1 to about 2 moles of borylating agent per mole of said member, under conditions conducive to anhydride formation, said amine and said anhydride being reacted in the proportion range of about 0.5 to 2 equivalents of anhydride per equivalent of amine.

2. The product of claim 1 where the amine is 3-"tallow"-aminopropylamine, said member is di(p-isooctylphenyl) dithiophosphate, the borylating agent is boric oxide, the molar proportion of borylating agent to said member is about 1:1 and the amine to anhydride equivalent proportion is about 2:1.

3. The product of claim 1 where the amine is 3-"tallow"-aminopropylamine, said member is ethyl lauryl monoacid orthophosphate, the borylating agent is boric oxide, the molar proportion of borylating agent to said member is about 1:1, and the amine to anhydride equivalent proportion is about 2:1.

4. The product of claim 1 where the amine is 3-"tallow"-aminopropylamine, said member is mono-di(2-ethylhexyl) orthophosphate, the borylating agent is boric oxide, the molar proportion of borylating agent to said member is about 0.3:1, and the amine to anhydride equivalent proportion is about 1:2 to 2:1.

5. The product of claim 1 where the amine is diethylamine, said member is mono-di(2-ethylhexyl) orthophosphate, the borylating agent is boric oxide, the molar proportion of borylating agent to said member is about 0.3:1, and the amine to anhydride equivalent proportion is about 1:1.

6. The product of claim 1 where the amine is 3-isopropylaminopropylamine, said member is mono-di(2-ethylhexyl) orthophosphate, the borylating agent is boric oxide, the molar proportion of borylating agent to said member is about 0.3:1, and the amine to anhydride equivalent proportion is about 2:1.

7. The process comprising reacting (a) an amine selected from the group consisting of primary, secondary and tertiary alkyl, alkenyl and alkylol mono- and diamines whose substituents contain 2 to 22 carbon atoms each, and (b) an anhydride prepared by reacting a member selected from the group consisting of partially esterified orthophosphoric acids and their thio analogues, at least one of whose substituents is a hydrocarbon radical containing 5 to 22 carbon atoms and the other substituent of which when present, is a hydrocarbon radical containing 1 to 22 carbon atoms, with a borylating agent selected from the group consisting of boric acid, boric oxide and an anhydride of boric oxide and an aliphatic monocarboxylic acid, under conditions conducive to anhydride formation, said borylating agent and said member being reacted in the proportion of about 0.1 to 2 moles of borylating agent per mole of said member, said amine and said anhydride being reacted in the proportion of about 0.5 to 2 equivalents of anhydride per equivalent of amine.

8. A fuel oil composition comprising a major proportion of a mixture of catalytically cracked and straight run fuel oil distillates and a small amount, sufficient to inhibit sludge deposition from said mixture, of a reaction product of (a) an amine selected from the group consisting of primary, secondary and tertiary alkyl, alkenyl and alkylol mono- and diamines whose substituents contain 2 to 22 carbon atoms each, and (b) an anhydride prepared by reacting a member selected from the group consisting of partially esterified orthophosphoric acids and their thio analogues, at least one of whose substituents is a hydrocarbon radical containing 5 to 22 carbon atoms and the other substituent of which when present, is a hydrocarbon radical containing 1 to 22 carbon atoms, with a borylating agent selected from the group consisting of boric acid, boric oxide, and an anhydride of boric oxide and an aliphatic monocarboxylic acid, where said borylating agent and said member are reacted in the proportion of about 0.1 to 2 moles of borylating agent per mole of said member, and where said amine and said anhydride are reacted in the proportion of about 0.5 to 2 equivalents of anhydride per equivalent of amine.

9. The composition of claim 8 where said small amount is about 0.005 to 1 percent by weight of the composition.

10. The composition of claim 8 where said small amount is about 0.01 to about 0.1 percent by weight of the composition.

11. The fuel oil composition of claim 8 where said amine is 3-"tallow"-aminopropylamine, said member is di(p-isooctylphenyl) dithiophosphate, the borylating agent is boric oxide, the molar proportion of said borylating agent to said member is about 1:1, and the equivalent proportion of anhydride to amine is about 1:2.

12. The fuel oil composition of claim 8 where said amine is 3-"tallow"-aminopropylamine, said member is ethyl lauryl monoacid orthophosphate, the borylating agent is boric oxide, the molar proportion of said borylating agent to said member is about 1:1, and the equivalent proportion of anhydride to amine is about 1:2.

13. The fuel oil composition of claim 8 where said amine is 3-"tallow"-aminopropylamine, said member is mono-di(2-ethylhexyl) orthophosphate, the borylating agent is boric oxide, the molar proportion of said borylating agent to said member is about 0.3:1, and the equivalent proportion of anhydride to amine is about 1:2 to 2:1.

14. The fuel oil composition of claim 8 where said amine is diethylamine, said member is mono-di(2-ethylhexyl) orthophosphate, the borylating agent is boric oxide, the molar proportion of said borylating agent to said member is about 0.3:1, and the equivalent proportion of anhydride to amine is about 1:1.

15. The fuel oil composition of claim 8 where said amine is 3-isopropylaminopropylamine, said member is mono-di(2-ethylhexyl) orthophosphate, the borylating agent is boric oxide, the molar proportion of said borylating agent to said member is about 0.3:1, and the equivalent proportion of anhydride to amine is about 1:2.

References Cited in the file of this patent

UNITED STATES PATENTS

| | | |
|---|---|---|
| 2,297,114 | Thompson | Sept. 29, 1942 |
| 2,648,696 | Whetstone | Aug. 11, 1953 |
| 2,676,987 | Lewis et al. | Apr. 27, 1954 |
| 2,816,128 | Allen | Dec. 10, 1957 |
| 2,863,744 | Cantrell et al. | Dec. 9, 1958 |
| 2,905,542 | Gottshall et al. | Sept. 22, 1959 |
| 2,928,727 | Richards | Mar. 15, 1960 |
| 2,978,502 | English et al. | Apr. 4, 1961 |
| 2,980,520 | Thayer | Apr. 18, 1961 |

UNITED STATES PATENT OFFICE
CERTIFICATE OF CORRECTION

Patent No. 3,115,398                                December 24, 1963

Helen I. Thayer

It is hereby certified that error appears in the above numbered patent requiring correction and that the said Letters Patent should read as corrected below.

Column 3, lines 6 to 10, after the closing braket, for "$(A)_X$" read -- $(A)_W$ --.

Signed and sealed this 2nd day of June 1964.

(SEAL)
Attest:

ERNEST W. SWIDER
Attesting Officer

EDWARD J. BRENNER
Commissioner of Patents